United States Patent
Krishnan et al.

[11] Patent Number: 5,900,451
[45] Date of Patent: May 4, 1999

[54] COLLAIDALLY STABILIZED BUTADIENE EMULSIONS

[75] Inventors: Venkataram Krishnan, Cary; Yakov S. Friedzon, Durham, both of N.C.

[73] Assignee: Reichhold Chemicals, Inc., Research Triangle Park, N.C.

[21] Appl. No.: 08/856,789

[22] Filed: May 15, 1997

[51] Int. Cl.$^6$ ................................. C08L 29/04
[52] U.S. Cl. ................................. 524/502; 524/459
[58] Field of Search ............... 524/502; 526/318, 526/320

[56] References Cited

U.S. PATENT DOCUMENTS

| | | | |
|---|---|---|---|
| 3,365,408 | 1/1968 | Ohara | 260/29.6 |
| 4,170,582 | 10/1979 | Mori | 526/320 |
| 4,257,935 | 3/1981 | Sekiguchi | 526/318 |
| 4,265,796 | 5/1981 | Mueller-Mall et al. | 260/29.6 |
| 4,336,172 | 6/1982 | Marquardt | 526/320 |
| 4,384,661 | 5/1983 | Page et al. | 222/394 |
| 4,417,016 | 11/1983 | Cline et al. | 524/156 |
| 4,477,613 | 10/1984 | Evans et al. | 524/77 |
| 4,670,181 | 6/1987 | Mollinger et al. | 252/186 |
| 4,834,096 | 5/1989 | Sonnabend | 526/313 |
| 5,200,459 | 4/1993 | Weih et al. | 524/459 |
| 5,296,627 | 3/1994 | Tang et al. | 558/34 |
| 5,428,095 | 6/1995 | Swidler | 524/389 |
| 5,444,112 | 8/1995 | Carnahan | 524/272 |
| 5,451,635 | 9/1995 | LaFleur et al. | 525/57 |
| 5,461,104 | 10/1995 | Daniel et al. | 524/505 |
| 5,491,209 | 2/1996 | Helmer | 526/320 |
| 5,496,884 | 3/1996 | Weih et al. | 524/503 |
| 5,502,089 | 3/1996 | Bricker et al. | 524/44 |
| 5,502,138 | 3/1996 | Krishnan | 526/318 |
| 5,519,084 | 5/1996 | Pak-Harvey et al. | 524/503 |
| 5,539,015 | 7/1996 | Horii et al. | 523/102 |
| 5,629,370 | 5/1997 | Freidzon | 524/503 |

FOREIGN PATENT DOCUMENTS

| | | |
|---|---|---|
| 1265549 | 5/1961 | France . |
| 57-180617 | 3/1982 | Japan . |
| WO 89/12618 | 12/1989 | WIPO . |

OTHER PUBLICATIONS

PCT International Search Report PCT/US 98/09938.

*Primary Examiner*—Paul R. Michl
*Attorney, Agent, or Firm*—Myers Bigel Sibley & Sajovec

[57] ABSTRACT

In one aspect, a stabilized emulsion polymer comprises an aliphatic conjugated diene monomer; a monomer selected from the group consisting of a non-aromatic unsaturated mono- or dicarboxylic ester monomer, an unsaturated aromatic monomer, a nitrogen-containing monomer, and mixtures thereof; a protective colloid; and a surfactant which has ethylenic unsaturation. As a result, the surfactant is polymerized with the monomer and is incorporated into the backbone of the emulsion polymer. In another aspect, the stabilized emulsion polymer includes an oxyalkylene functional monomer selected from the group consisting of:

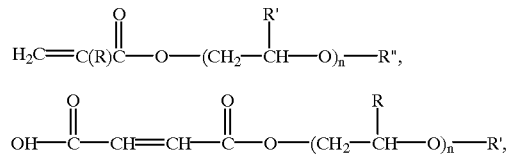

monoesters of mono- and dicarboxylic acids, diesters of dicarboxylic acids, and mixtures thereof; wherein R is selected from the group consisting of hydrogen and $C_1$–$C_4$ alkyl; R' is selected from the group consisting of hydrogen and $C_1$–$C_4$ alkyl; R" is selected from the group consisting of hydrogen and $C_1$–$C_4$ alkyl; and n is an integer ranging from 1 to 30. The oxyalkylene functional monomer reacts with the monomer and thus becomes incorporated into the backbone of the emulsion polymer.

18 Claims, No Drawings

COLLAIDALLY STABILIZED BUTADIENE EMULSIONS

FIELD OF THE INVENTION

The invention relates to emulsion polymers, and more specifically, emulsion polymers that have been stabilized by a protective colloid and have useful applications in many areas, especially in adhesives and coatings.

BACKGROUND OF THE INVENTION

Emulsion polymers are typically stabilized by surfactants, or by a combination of surfactants and protective colloids such as polyvinylalcohol, hydroxyethyl cellulose (HEC), dextrin, and the like. Protective colloids have typically been used in the polymerization of highly reactive, hydrophilic monomers such as vinyl acetate, and common polymers that use this approach include for example polyvinylacetate, vinyl acetate-ethylene (VAE), and vinyl acrylics. One possible reason why the use of protective colloids is rare in the emulsion polymerization of hydrophobic monomers, such as styrene and butadiene, could be due to the fact that it is extremely difficult to make stable emulsions in these systems, especially if one targets a solids content of greater than 50 weight percent. It is interesting to consider the use of protective colloids such as polyvinylalcohol or HEC because of the unique rheology and tack properties these systems possess compared to conventional surfactant stabilized latices. Accordingly, the protective colloids are potentially very useful in many adhesive and coating-related applications.

While numerous patents and published articles exist illustrating the use of polyvinylalcohol or other colloids in vinyl acetate based polymers, a possible way of addressing the problem of coagulation in butadiene and styrene-based emulsions has only been recently reported. In particular, Kuraray Co. Ltd. in Yuki et al., *Polymer International* 30(4):512 (1993) proposes a mercapto terminated polyvinylalcohol which is grafted onto a styrene polymer to form a stable emulsion. This is a two-step process in which the first step is to make the mercapto functional polyvinylalcohol (Sato et al., *Makromolekulare Chemie* 194:175 (1993)). The functionalized polyvinylalcohol is then used in a conventional emulsion polymerization process to make a colloidally stabilized polystyrene emulsion. The use of this approach for making butadiene emulsions has been reported in Japanese Patent Nos. 5059106; 6128443; 6179705; and 7070989.

Another approach to making butadiene emulsions stabilized by polyvinylalcohol has been proposed in U.S. Pat. No. 5,200,459. In this instance, butadiene polymer latices stabilized by polyvinylalcohol are prepared by the emulsion polymerization of butadiene with other monomers in the presence of a solvent such as methanol. The methanol or other solvent is subsequently removed from the latex by a stripping process to yield a solvent-free latex.

Potential drawbacks exist with both of the above approaches. With respect to the first approach, the use of a mercapto-functional alcohol is restrictive because the process has trouble working with conventional polyvinylalcohols. With respect to the second approach, the use of a solvent to facilitate stabilization poses potential problems relating to solvent handling, recovery, and recycling.

SUMMARY OF THE INVENTION

In view of the above, it is an object of the present invention to provide a stabilized emulsion polymer which may employ conventional protective colloids such as polyvinyl alcohols.

It is another object of the present invention to provide a stabilized emulsion polymer which addresses potential problems associated with using a cosolvent during polymerization in conventional polyvinylalcohol-stabilized butadiene emulsion polymers.

To these ends and others, in one aspect, the present invention provides a stabilized emulsion polymer. The stabilized emulsion polymer comprises an aliphatic conjugated diene monomer; a monomer selected from the group consisting of a non-aromatic unsaturated mono- or dicarboxylic ester monomer, an unsaturated aromatic monomer, a nitrogen-containing monomer, and mixtures thereof; and a protective colloid. The polymer also includes a surfactant which has ethylenic unsaturation. As a result, the surfactant is copolymerized during emulsion polymerization and is incorporated into the backbone of the polymer.

In another aspect, the present invention provides a stabilized emulsion polymer which includes an aliphatic conjugated diene monomer; a monomer selected from the group consisting of a non-aromatic unsaturated mono- or dicarboxylic ester monomer, an unsaturated aromatic monomer, a nitrogen-containing monomer, and mixtures thereof; and a protective colloid. An oxyalkylene functional monomer is also present during emulsion polymerization and is of a formula selected from the group consisting of:

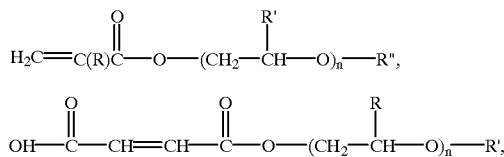

mono- and diesters of dicarboxylic acids, diesters of dicarboxylic acids, and mixtures thereof, wherein R is selected from the group consisting of hydrogen and $C_1$–$C_4$ alkyl, R' is selected from the group consisting of hydrogen and $C_1$–$C_4$ alkyl, R" is selected from the group consisting of hydrogen and $C_1$–$C_4$ alkyl, and n is an integer ranging from 1 to 30. The oxyalkylene functional monomer reacts during polymerization and becomes incorporated into the backbone of the polymer, and thus provides stability to the polymer.

DETAILED DESCRIPTION OF THE INVENTION

The present invention now will be described more fully hereinafter with reference to the specification, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In one aspect, the invention relates to a stabilized emulsion polymer. The polymer comprises an aliphatic conjugated diene monomer; a monomer selected from the group consisting of a non-aromatic unsaturated mono- or dicarboxylic ester monomer, an unsaturated aromatic monomer, a nitrogen-containing monomer, and mixtures thereof, a protective colloid; and a surfactant which has ethylenic unsaturation. The surfactant is copolymerized with the monomer during emulsion polymerization and thus becomes incorporated into the backbone of the polymer. As a result, stability is provided to the latex. Unlike conventional surfactants which are adsorbed on the latex particle surface, the surfactants containing ethylenic unsaturation copolymerize with other monomers and thus are more effective than conventional surfactants. Due to their surface active nature, the surfactants containing ethylenic unsaturation are preferably located at the particle surface and thus provide stability to the latex. Since these surfactants are an integral part of the polymer, they cannot desorb from the polymer unlike conventional surfactants. The surfactants containing ethylenic unsaturation are available at the particle interface to provide a more permanent degree of stabilization.

Suitable aliphatic conjugated dienes are $C_4$ to $C_9$ dienes and include, for example, butadiene monomers such as 1,3-butadiene, 2-methyl-1,3-butadiene, 2 chloro-1,3-butadiene, and the like. Blends or copolymers of the diene monomers can also be used. The aliphatic conjugated diene is preferably used in an amount, based on total weight of the starting monomers, from about 5 to about 95 percent by weight, and more preferably from about 20 to about 80 percent by weight. A particularly preferred aliphatic conjugated diene is 1,3-butadiene.

Suitable non-aromatic unsaturated mono- or dicarboxylic ester monomers include acrylates and methacrylates. The acrylates and methacrylates may include functional groups such as amino groups, hydroxy groups, epoxy groups and the like. Exemplary acrylates and methacrylates include methyl acrylate, methyl methacrylate, ethyl acrylate, ethyl methacrylate, butyl acrylate, butyl methacrylate, 2-ethylhexyl acrylate, glycidyl acrylate, glycidyl methacrylate, hydroxyethyl acrylate, hydroxyethyl methacrylate, hydroxypropyl acrylate, hydroxypropyl methacrylate, isobutyl methacrylate, hydroxybutyl acrylate, hydroxybutyl methacrylate, 3-chloro-2-hydroxybutyl methacrylate, n-propyl methacrylate and the like. Exemplary amino-functional methacrylates include t-butylamino ethyl methacrylate and dimethylamino ethyl methacrylate. Suitable non-aromatic dicarboxylic ester monomers are mono- and dialkyl fumarates, itaconates and maleates, with the alkyl group having one to eight carbons, with or without functional groups. Specific monomers include mono- and dimethyl fumarates, itaconates and maleates. Suitable non-aromatic dicarboxylic ester monomers include di(ethylene glycol) maleate, di(ethylene gllycol) itaconate, bis(2-hydroxyethyl) maleate, 2-hydroxyethyl methyl fumarate, and the like.

The non-aromatic unsaturated mono- or dicarboxylic ester monomer is used in an amount, based on total weight of the starting monomers, preferably from about 5 to about 95 percent by weight, and more preferably from about 20 to 80 about percent by weight. A particularly preferred non-aromatic unsaturated monocarboxylic ester monomer is methyl methacrylate.

Various aromatic unsaturated monomers may be used and include, but are not limited to, styrene and styrene derivatives such as alphamethylstyrene, p-methyl styrene, vinyltoluene, ethylstyrene, tert-butyl styrene, monochlorostyrene, dichlorostyrene, vinyl benzyl chloride, fluorostyrene, alkoxystyrenes (e.g., paramethoxystyrene) and the like. Mixtures of the above may be used. Preferably, styrene is employed. The aromatic unsaturated monomers are preferably used from about 5 to about 95 percent based on the total monomer weight, and more preferably from about 20 to about 80 percent by weight.

Exemplary nitrogen-containing monomers which may be used include, for example, acrylonitrile, methacrylonitrile, acrylamide, and methacrylamide. Acrylonitrile is preferred. Mixtures of the above may be used. The nitrogen-containing monomers are preferably used, for example, in an amount ranging from about 5 to about 95 percent based on the total weight of the monomers, and more preferably from about 20 to about 80 percent by weight.

Known and conventional protective colloids may be employed in the emulsion polymer such as partially and fully hydrolyzed polyvinyl alcohols; cellulose ethers, e.g., hydroxymethyl cellulose, hydroxyethyl cellulose, hydroxypropyl cellulose, starch and starch derivatives, carboxymethyl cellulose (CMC); the natural and synthetic gums, e.g., gum tragacanth and gum arabic; polyacrylic acid; acrylates; poly(vinyl alcohol)co(vinyl amine)copolymers, and the like. Partially and fully hydrolyzed polyvinylalcohols are typically used and are preferably employed from about 0.1 to about 10 percent based on the weight of the total monomer, more preferably from about 1 to about 8 percent, and most preferably from about 2 to about 6 percent.

In accordance with the invention, a surfactant which contains ethylenic unsaturation is used and is copolymerized with other monomers during emulsion polymerization. As a result, the surfactant is incorporated into the backbone of the polymer and serves to stabilize the latex. Examples of suitable surfactants containing ethylenic unsaturation are provided in U.S. Pat. No. 5,296,627 to Tang et al., the disclosure of which is incorporated by reference herein in its entirety. Preferably, the surfactants have a hydrophobic portion which possesses terminal ethylenic unsaturation and a hydrophilic portion which contains a poly(alkyleneoxy) segment. The hydrophilic segment may also contain an ionic (anionic, nonionic, or cationic) segment. Exemplary polymerizable surfactant compounds of the present invention may be represented by the following formula (I):

wherein R is an organic monovalent radical having terminal olefinic (ethylenic) unsaturation. More particularly, R is an organic radical selected from the group consisting of terminally unsaturated $C_2$–$C_{18}$ alkenyl, e.g., vinyl and allyl, acrylyl, acrylyl ($C_2$–$C_{10}$) alkyl, methacrylyl, methacrylyl ($C_1$–$C_{10}$) alkyl, vinylphenyl and vinylphenylene ($C_1$–$C_6$) alkyl. More particularly, the unsaturated $C_2$–$C_{18}$ alkenyl group may be represented by the following formula (II):

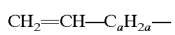

wherein a is a number between 0 and 16. When a is 0, the alkenyl group is vinyl, i.e., $CH_2$=$CH$—. When a is 1, the alkenyl group is allyl, i.e., $CH_2$=$CH$—$CH_2$—.

The acrylyl, acrylyl ($C_1$–$C_{10}$) alkyl, methacrylyl and methacrylyl ($C_1$–$C_{10}$) alkyl groups may be represented by the following formula (III):

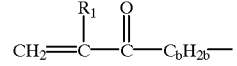

wherein $R_1$ is hydrogen or methyl, and b is a number from 0 to 10. When b is 0 and $R_1$ is hydrogen, the group is acrylyl [$CH_2$=$CH$—$C(O)$—]. When b is 0 and $R_1$ is methyl, the group is methacrylyl [$CH_2$=$C(CH_3)$—$C(O)$—]. When $R_1$ is hydrogen and b is 1, the group is acrylyl methyl [$CH_2$=$CH$—$C(O)$—$CH_2$—].

The vinylphenylene and vinylphenylene ($C_1$–$C_6$) alkyl groups may be represented by the following formula (IV):

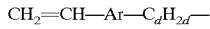

wherein Ar is phenylene and d is a number between 0 and 6. When d is 0, the group is vinylphenyl, and when d is 1, the group is vinylphenylene methyl.

In formula I above, —R'O— is a bivalent alkyleneoxy substituted group derived from a cyclic ether other than ethylene oxide or mixture of such cyclic ethers. More particularly, —R'O— may be represented by the formula —$CH_2CH(R''—)—O—$, wherein R" is methyl, ethyl, phenyl, or phenyloxymethyl, —$CH_2$—$(CH_2)_2$—$CH_2$—O—, and mixtures thereof. Still more particularly, —R'O— may be described as the bivalent radical derived from cyclic ethers selected from the group consisting of propylene oxide, (e.g., 1,2-epoxypropane), butylene oxide (e.g., 1,2-epoxybutane), styrene oxide [(epoxyethyl)benzene], tetrahydrofuran, phenyl glycidyl ether (1,2-epoxy-3-phenoxypropane), and mixtures thereof.

Preferably, —R'O— is the bivalent epoxy group derived from propylene oxide, butylene oxide and mixtures of propylene oxide and butylene oxide. More preferably, —R'O— is the bivalent epoxy group derived from butylene oxide. When mixtures of butylene oxide and propylene oxide are used, it is preferred that the mixture comprise greater than about 50 mole percent butylene oxide, e.g., greater than about 75 to 80 mole percent butylene oxide.

The letter E in formula I is the bivalent ethylene radical, and m and n are each numbers which may vary from about 5 to about 100, preferably between about 5 or 10 and about 50. More preferably, m is a number that varies from about 10 to about 15, e.g., 12 to 15, and n is a number that varies from about 10 to about 40, e.g., 15 to 35.

The ratio of m:n may vary from about 20:1 to about 1:20, preferably from about 1.5:1 to about 1:4, e.g., 1:1.25 to 1:1.5. The specific ratio of m:n used will depend on the particular polymerization system in which the ethylenically unsaturated surfactant of the present invention is incorporated. Varying the ratio of m:n will vary the HLB (Hydrophilic-Lipophilic Balance) of the ethylenically unsaturated surfactant compound. If the polymerization system requires a hydrophobic surfactant, m will be greater than n. Conversely, if the emulsion polymerization system requires a hydrophilic surfactant, then m will be less than n.

The ratio of m:n should be chosen so that the resulting compound is capable of reducing the surface tension of water. Preferably, the surface tension of a 0.1 weight percent aqueous solution of the ethylenically unsaturated surfactant compound at 25° C. is less than 38 dynes per centimeter. More preferably, the surface tension of such a solution is in the range of 30 to 35 dynes per centimeter. Surface tension may be measured by a Du Nouy tensiometer.

X in formula I is selected from an ionic group consisting of hydroxyl (—OH), chloride (—Cl), sulfonate (—$SO_3$), sulfate (—$OSO_3$), monophosphate [—O—$P(O)(OH)_2$], diphosphate [—O—$P(O)(OH)_2]_2$, acetate (—$CH_2$—C(O)OH), isethionate (—$CH_2$—$CH_2$—$SO_3H$), and the alkali metal salts of the aforedescribed sulfonate, sulfate, phosphate, acetate, and isethionate anionic groups, tertiary amino, e.i., —$N(R_2)(R_3)R_4$, wherein $R_2$, $R_3$ and $R_4$ are each selected from the group consisting of alkyl and hydroxyalkyl groups, particularly groups containing from 1 to 5 carbon atoms, e.g., a tertiary amine derived from trimethylamine, triethylamine, triethanolamine and diethylmethylamine. More particularly, X may be selected from the group consisting of sulfonate, sulfate, monophosphate (and alkali metal salts thereof), chloride and tertiaryamino. As used herein, the term "alkali metal" includes sodium, potassium, lithium and ammonium.

A preferred polymerizable surfactant is SAM 186 N™ sold by PPG Industries, Inc. of Pittsburgh, Pa.

The polymerizable surfactant may be used in various amounts. Specifically, the stabilized emulsion polymer may include between about 0.1 and 5 percent polymerizable surfactant based on the total monomer weight, more preferably from about 1 to about 4 weight percent, and most preferably from about 2 to about 3 weight percent.

Conventional surfactants may be used in conjunction with the surfactant having ethylenic unsaturation described herein. Such surfactants are preferably of the anionic and nonionic type. The selection of these surfactants is apparent to one skilled in the art. Preferred nonionic surfactants are selected from the family of alkylphenoxypoly(ethyleneoxy)ethanols where the alkyl group typically varies from $C_7$–$C_{18}$ and the ethylene oxide units vary from 4–100 moles. Various preferred surfactants in this class include the ethoxylated octyl and nonyl phenols, and in particular ethoxylated nonyl phenols with a hydrophobic/lipophilic balance (HLB) of 15–19. Anionic surfactants can be selected from the broad class of sulfonates, sulfates, ethersulfates, sulfosuccinates, diphenyloxide disulfonates, and the like, and are readily apparent to anyone skilled in the art.

An unsaturated mono- or dicarboxylic acid monomer may also be included in the stabilized emulsion polymer. These monomers include, but are not limited to, acrylic acid, methacrylic acid, itaconic acid, fumaric acid, and maleic acid. Derivatives, blends, and mixtures of the above may also be used. The unsaturated mono- or dicarboxylic acid monomer may be used in an amount ranging from about 0 to about 15 percent based on the total monomer weight, and more preferably from about 0 to about 5 weight percent. Mono alkyl esters of dicarboxylic acid can also be used in which the alkyl group varies from $C_1$ to $C_8$.

Additional comonomers can be added to the stabilized emulsion polymer. Included among such additional comonomers are monoethylenically unsaturated substituted aliphatic hydrocarbons such as vinyl chloride, and vinylidene chloride; aliphatic vinyl esters such as vinyl formate, vinyl propionate, vinyl versatate, and vinyl butyrate.

The stabilized emulsion polymer can include additives to enhance its various physical and mechanical properties, the selection of which is readily apparent to one skilled in the art. For example, crosslinking agents can be used such as vinylic compounds (e.g., divinyl benzene); allyllic compounds (e.g., allyl methacrylate, diallyl maleate); multifunctional acrylates (e.g., di, tri and tetra (meth)acrylates); self crosslinking monomers such as N-methylol acrylamide, N-methylol methacrylamide and $C_1$–$C_4$ ethers of these monomers respectively (e.g., N-iso[butoxy] methacrylamide), acrylamido glycolic acid and its esters, and alkyl acrylamido glycolate alkyl ethers (e.g., methylacrylamido glycolate methyl ether). The crosslinking agents can be included in amounts of up to about 6 percent by weight, and preferably from about 0 to about 4 percent by weight. Additional monomers such as silanes can be included to improve specific properties such as latex stability, solvent resistance, as well as adhesion and strength. The selection of these is well known in the art.

Initiators which facilitate polymerization are typically used and include, for example, materials such as persulfates, organic peroxides, peresters, and azo compounds such as azobis(isobutyronitrile) (AIBN). Persulfate initiators are preferred and include, for example, potassium persulfate and ammonium persulfate.

Reductants may be employed in the polymerization, and are typically employed in combination with an oxidant as part of a redox system. Suitable reductants include sodium bisulfite, erythorbic acid, ascorbic acid, sodium thiosulfate, sodium formaldehyde sulfoxylate (SFS), and the like. One example of a redox system includes diisopropylbenzene hydroperoxide as an oxidant, SFS, and ferrous sulfate.

Other additives which may be used include other natural and synthetic binders, fixing agents, wetting agents, plasticizers (e.g., diisodecyl phthalate), softeners, foam-inhibiting agents, froth aids, other crosslinking agents (e.g., melamine formaldehyde resin, isocyanurates, blocked isocyanates, urethanes, epoxies, etc.), flame retardants, antioxidants, dispersing agents (e.g., tetrasodium pyrophosphate), pH adjusting components (e.g., ammonium hydroxide), sequestering or chelating agents (e.g., ethylene diaminetetraacetic acid (EDTA)), tackifiers, humectants, and other components. The selection of any of these additives is readily apparent to one skilled in the art.

In another aspect, the invention relates to a stabilized emulsion polymer which includes an aliphatic conjugated diene; a monomer selected from the group consisting of a non-aromatic unsaturated mono- or dicarboxylic ester monomer, an unsaturated aromatic monomer, a nitrogen-containing monomer, and mixtures thereof; and a protective colloid. In this aspect, the stabilized emulsion polymer also includes an oxyalkylene functional monomer which becomes incorporated into the backbone of the polymer. The oxyalkylene functional monomer may be of the formula:

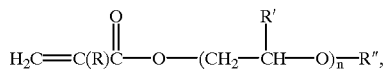

In the above formula, R is selected from the group consisting of hydrogen and $C_1$–$C_4$ alkyl; R' is selected from the group consisting of hydrogen and $C_1$–$C_4$ alkyl; R" is selected from the group consisting of hydrogen and $C_1$–$C_4$ alkyl; and n is an integer ranging from 1 to 30. Preferably in the above formula, R is selected from the group consisting of H and $C_1$ alkyl, R' is selected from the group consisting of H and $C_1$ alkyl, and R" is selected from the group consisting of H and $C_1$ alkyl. More preferably, R is $C_1$ alkyl, R' is hydrogen, R" is $C_1$ alkyl, and n is between 5 and 17. Most preferably, n is between 8 and 12. Combinations of the above monomers with n being of values outside of the above ranges can be used. For example, an oxyalkylene monomer with an n value of 40 could be used in combination with a monomer having an n value of 1 such that the average n value is within the range set forth herein. The selection of the above monomers can be made by the skilled artisan to obtain the desired properties.

The oxyalkylene functional monomer may also be a half ester of an unsaturated dicarboxylic acid. These components are represented by the formula below:

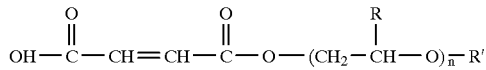

with R, R', and n being defined herein. Mono- or diesters of dicarboxylic acids can also be used. Exemplary dicarboxylic acids which may be used in forming the half esters or diesters include, but are not limited to, succinic, maleic, itaconic, fumaric, and the like. Monoesters of monocarboxylic acids may be used. Preferably, R is selected from the group consisting of H and $C_1$ alkyl and R' is selected from the group consisting of $C_1$–$C_4$ alkyl. Mixtures of the oxyalkylene functional monomers set forth in both formulae may be used in the invention.

The oxyalkylene functional monomer may be used in various amounts. Preferably, the oxyalkylene functional monomer is used from about 0.1 to about 7 percent based on the total monomer weight, and more preferably from about 1 to about 3 weight percent.

The stabilized emulsion polymer having an oxyalkylene functional monomer incorporated therein also may contain any of the monomers, additives, or surfactants described herein. As an example, the stabilized emulsion polymer may be used in conjunction with an oxyalkylene functional monomer and a surfactant containing ethylenic unsaturation. In such an instance, it is preferred that the stabilized emulsion polymer contain from about 1 to about 3 weight percent of oxyalkylene functional monomer and from about 0.5 to about 2 weight percent of surfactant containing ethylenic unsaturation. The above ranges may be interchanged between the monomer and surfactant.

The emulsion polymerization may be carried out according to known and suitable means, including batch and semi-continuous techniques. Subsequent to the emulsion polymerization taking place, a stripping step may be carried out to remove unreacted monomer and other volatile components which may be present. Any suitable technique may be used to carry out the stripping step including the use of steam (i.e., steam stripping) alone or in combination with a redox system (i.e., chemical stripping).

The stabilized emulsion polymers produced in accordance with the invention have several advantageous end uses. For example, the polymers may be utilized as redispersible powders for cement modification, and adhesives for various substrates including, but not limited to, wood, vinyl, polyester, polyolefins, and cellulosics. The polymers may also be used in areas such as garment and pad dyeing, printing, paper coating, masonry, latex concrete, tape joint cement, and the like. The polymers may also be used as adhesives in various applications relating to, for example, packaging, bookbinding, automotive (e.g., gasketing), film lamination, and the like. The adhesives may be used in the above applications as a pressure sensitive adhesive. The polymers may be used in other end applications not listed herein as deemed suitable by the skilled artisan.

The following examples are illustrative of the present invention and are not to be construed as limiting thereon.

EXAMPLE 1

Semicontinuous Process Using Polymerizable Surfactant

Demineralized water (45–65 phm) is heated to about 180° F. and Airvol 203™ (4 phm) and Airvol 103™ polyvinylalcohols are added to the water while mixing thoroughly until the polyvinylalcohols are completely dissolved. The remaining ingredients such as a chelating agent (EDTA, 0.05 phm), surfactants such as sodium dodecyl benzene sulfonate (0.15 phm), nonylphenoxypoly(ethyleneoxy)ethanol (1 phm) (20 mole ethoxylation), polymerizable surfactant SAM 186 N™ (2 phm), and polyethylene glycol (PEG 600™, were dissolved in demineralized water (50–70 phm) and added along with the polyvinyl alcohol solution into a 1 gallon reactor. The contents were then heated to 140° F. and a solution of 0.03 phm ammonium persulfate (initiator) and 2 phm demineralized water was injected into the reactor. About 10 percent of a monomer mix comprising butadiene (45 phm), methyl methacrylate (54 phm), acrylic acid (1 phm), and tertiary dodecyl mercaptan (0.6 phm) is then charged into the reactor and the temperature is maintained at 140° F. for 30 minutes. The remaining monomer is fed over 5 hours and the desired reaction rate is maintained by raising the temperature and/or injecting more initiator. The reaction is carried out to greater than 96 percent conversion. The pH is adjusted to 6.5–7.0 with 28 percent ammonium hydroxide, and the polymer is stripped to 52.9 weight percent solids.

The stabilized emulsion polymer comprises (based on percent weight of the monomers) 45 percent butadiene, 54 percent methyl methacrylate, and 1 percent acrylic acid. The emulsion polymer has a viscosity of 1070 cps.

EXAMPLE 2

A process similar to Example 1 is carried out, except that the monomer composition comprises 45 percent butadiene, 30 percent methyl methacrylate, 10 percent styrene, and 15 percent butyl acrylate. The stripped polymer has a viscosity of 3075 cps at 54.7 percent solids.

EXAMPLE 3

A process similar to Example 1 is carried out, except that the monomer composition comprises 29 percent butadiene, 70 percent methyl methacrylate, and 1 percent acrylic acid. The stripped polymer has a viscosity of 320 cps at 51.5 percent solids.

EXAMPLE 4

Semicontinuous Process Using Oxyalkylene Functional Monomer

A process similar to Example 1 is carried out, except that the surfactant sodium dodecyl benzenesulfonate is replaced with 0.3 phm dodecyl diphenyloxide disulfonate, and the polymerizable surfactant SAM 186 N™ is replaced with a 12 mole ethoxylated polyethylene glycol methacrylate. The polymer composition comprises 29 percent butadiene, 70 percent methyl methacrylate, and 1 percent acrylic acid. The final stripped viscosity of the polymer is 212 cps at 51.5 percent solids. When stripped to a solids content of 61.7 percent, the polymer viscosity is 3975 cps.

EXAMPLE 5

A process similar to Example 4 was carried out except that 30 mole ethoxylated nonyl phenol was used instead of the 20 mole version. The monomer composition comprises 45 percent butadiene, 28 percent methyl methacrylate, 10 percent styrene, 15 percent butyl acrylate, and 2 percent polyethylene glycol methacrylate (12 mole ethoxylation). The SAM 186 N™ is removed completely in this example, and is replaced by the oxyethylene functional monomer. The resulting polymer has a viscosity of 2575 cps at 50.4 percent solids.

Many modifications and other embodiments of the invention will come to mind in one skilled in the art to which this invention pertains having the benefit of the teachings presented in the foregoing descriptions. Therefore, it is to be understood that the invention is not to be limited to the specific embodiments disclosed. Although specific terms are employed, they are used in a generic and descriptive sense only and not for purposes of limitation, and that modifications and embodiments are intended to be included within the scope of the appended claims.

That which is claimed:

1. A stabilized emulsion polymer comprising:
   an aliphatic conjugated diene monomer;
   an additional monomer selected from the group consisting of a non-aromatic unsaturated mono- or dicarboxylic ester monomer, an unsaturated aromatic monomer, a nitrogen-containing monomer, and mixtures thereof;
   a protective colloid present with said aliphatic conjugated diene monomer and said additional monomer during polymerization to become incorporated into said stabilized emulsion polymer, wherein said protective colloid is polyvinylalcohol; and
   a surfactant which has ethylenic unsaturation such that said surfactant is copolymerized with said aliphatic conjugated diene monomer and said additional monomer, wherein said surfactant is incorporated into the backbone of said emulsion polymer and stabilizes said emulsion polymer.

2. The stabilized emulsion polymer according to claim 1, wherein said non-aromatic unsaturated mono- or dicarboxylic ester monomer is methyl methacrylate.

3. The stabilized emulsion polymer according to claim 1, wherein said aliphatic conjugated diene monomer is 1,3-butadiene.

4. The stabilized emulsion polymer according to claim 1, wherein said surfactant is a nonionic surfactant.

5. The stabilized emulsion polymer according to claim 1, wherein said surfactant contains alkylene oxide units.

6. The stabilized emulsion polymer according to claim 1, wherein said aromatic unsaturated monomer is styrene.

7. The stabilized emulsion polymer according to claim 1, further comprising a mono- or dicarboxylic acid monomer.

8. The stabilized emulsion polymer according to claim 7, wherein the mono- or dicarboxylic acid monomer is acrylic acid.

9. The stabilized emulsion polymer according to claim 1, wherein said nitrogen-containing monomer is acrylonitrile.

10. A stabilized emulsion polymer comprising:
    an aliphatic conjugated diene monomer;
    an additional monomer selected from the group consisting of a non-aromatic unsaturated mono- or dicarboxylic ester monomer, an unsaturated aromatic monomer, a nitrogen-containing monomer, and mixtures thereof;
    a protective colloid present with said aliphatic conjugated diene monomer and said additional monomer during polymerization to become incorporated into said stabilized emulsion polymer, wherein said protective colloid is polyvinylalcohol; and
    an oxyalkylene functional monomer selected from the group consisting of:

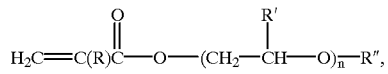

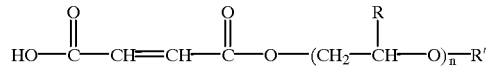

monoesters of mono-and dicarboxylic acids, diesters of dicarboxylic acids, and mixtures thereof; wherein R is selected from the group consisting of hydrogen and $C_1$–$C_4$ alkyl; R' is selected from the group consisting of hydrogen and $C_1$–$C_4$ alkyl; R" is selected from the group consisting of hydrogen and $C_1$–$C_4$ alkyl; and n is an integer ranging from 1 to 30; wherein said oxyalkylene functional monomer copolymerizes with said aliphatic conjugated diene monomer and said additional monomer to become incorporated into the backbone of said polymer to stabilize said emulsion polymer.

11. The stabilized emulsion polymer according to claim 10, wherein said oxyalkylene functional monomer is of the formula:

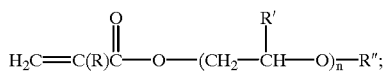

wherein R is $C_1$ alkyl; R' is hydrogen; R" is $C_1$ alkyl; and n ranges from 8 to 12.

12. The stabilized emulsion polymer according to claim 10, wherein said non-aromatic unsaturated mono- or dicarboxylic ester monomer is methyl methacrylate.

13. The stabilized emulsion polymer according to claim 10, wherein said aliphatic conjugated diene monomer is 1,3-butadiene.

14. The stabilized emulsion polymer according to claim 10, wherein said aromatic unsaturated monomer is styrene.

15. The stabilized emulsion polymer according to claim 10, further comprising a mono- or dicarboxylic acid monomer.

16. The stabilized emulsion polymer according to claim 15, wherein the mono- or dicarboxylic acid monomer is acrylic acid.

17. The stabilized emulsion polymer according to claim 10, wherein said nitrogen-containing monomer is acrylonitrile.

18. The stabilized emulsion polymer according to claim 10, further comprising a surfactant which has ethylenic unsaturation wherein said surfactant is incorporated into the backbone of said emulsion polymer.

* * * * *

UNITED STATES PATENT AND TRADEMARK OFFICE
CERTIFICATE OF CORRECTION

PATENT NO.   : 5,900,451
DATED        : May 4, 1999
INVENTOR(S)  : Venkataram Krishnan et al.

It is certified that error appears in the above-indentified patent and that said Letters Patent is hereby corrected as shown below:

Title Page, Item [54]   "COLLAIDALLY STABILIZED BUTADIENE EMULSIONS"
and Col. 1, lines 1-2,  should read
                        --COLLOIDALLY STABILIZED BUTADIENE EMULSIONS --.

Signed and Sealed this

Twenty-third Day of November, 1999

Attest:

Q. TODD DICKINSON

Attesting Officer      Acting Commissioner of Patents and Trademarks

UNITED STATES PATENT AND TRADEMARK OFFICE
CERTIFICATE OF CORRECTION

PATENT NO. : 5,900,451
DATED : May 4, 1999
INVENTOR(S) : Venkataram Krishnan et al.

It is certified that error appears in the above-identified patent and that said Letters Patent is hereby corrected as shown below:

Title page item,

Inventors [75]     "Yakov S. Friedzon"
                   should read
                   -- Yakov S. Freidzon --.

Signed and Sealed this

Twenty-second Day of May, 2001

Attest:

NICHOLAS P. GODICI

Attesting Officer     Acting Director of the United States Patent and Trademark Office